2,999,881
Patented Sept. 12, 1961

2,999,881
ACRYLAMIDE MONOMER POLYMERIZATION INHIBITOR
George C. Gleckler, Springdale, and George L. Sutherland, Stamford, Conn., assignors to American Cyanamid Company, New York, N.Y., a corporation of Maine
No Drawing. Filed Mar. 2, 1959, Ser. No. 796,201
8 Claims. (Cl. 260—561)

This invention relates to acrylamides. More particularly, it relates to acrylamide and α-alkyl acrylamides and particularly to the stabilization of solutions of such acrylamides against polymerization.

Acrylamide and α-alkyl acrylamides and the polymerization and copolymerization products thereof are employed in various fields. They are of particular importance in such fields as adhesives, dispersants, plasticizers, surface coatings, thickening agents, as well as in the leather, paper, textile, and photographic arts. Because of these many potential applications, methods of preparing the monomers are of particular interest.

The monomers are usually prepared by reacting the corresponding acrylonitrile with water and concentrated sulfuric acid. The reaction mixture comprising the amide sulfate is then further treated to separate the free amide. This may be conducted in various ways, one of which comprises treating an aqueous solution of the amide sulfate with an alkaline earth metal hydroxide or carbonate to precipitate an insoluble sulfate. Another procedure comprises treating a solution of the amide sulfate in an organic solvent with ammonia or an alkaline metal hydroxide or carbonate to form the corresponding sulfate which is insoluble in the solvent.

An unusually successful procedure particularly adapted for the neutralization of acrylamide sulfate comprises treating an aqueous solution thereof with ammonia under controlled conditions of temperature and hydrogen ion concentration. Under these controlled conditions, the normally water-soluble ammonium sulfate precipitates and may be separated.

In each of these modes of neutralization, the residual liquor is usually treated to recover a crystalline product. Regardless of how the neutralization and crystallization are conducted, at some point in the process elevated temperatures are generally employed which aggravate the problem of premature polymerization. This problem is still further aggravated in continuous neutralization systems because of the extended residence time within the system of part of the original liquor due to the recycling of amide-bearing streams.

Although the present invention is particularly concerned with inhibiting polymerization during the preparation acrylamides, the problem exists in other situations. Thus, polymerization may also be a problem when storing a solution of an amide as well as when employing an amide as an intermediate under conditions favorable for polymerization. It is apparent, therefore, that there are various situations in which stabilization of an amide solution is highly desirable.

It would appear that this problem of premature polymerization could be readily overcome by incorporating in the amide-bearing solution any of known materials which have been suggested as polymerization inhibitors. Many of these materials, however, have been found unsatisfactory for one or more of various reasons. Some satisfactorily inhibit polymerization but discolor the solution and/or are difficult to remove prior to use of the solution for polymerization. Still others have been found to be ineffective as polymerization inhibitors for any extended period of time, particularly during the preparation of amides under reduced pressures.

In accordance with the present invention it has been found that the polymerization of solutions of acrylamide and α-alkyl acrylamides can be effectively inhibited for extended periods of time by producing therein as a polymerization inhibitor a chelate of N-nitrosophenylhydroxylamine having the formula

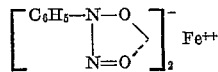

The ammonium salt of N-nitrosophenylhydroxylamine (cupferron), a well-known compound, is employed in the formation of the inhibitors of this invention. This salt has found considerable use as a means for quantitatively removing certain metals from solution by forming insoluble complexes with such metals. In view of this, it is a particularly surprising feature of the present invention that the ferrous iron complex of cupferron, which is practically insoluble in water, is unusually soluble in aqueous solutions of the amides contemplated herein.

Furthermore, the inhibitor within the purview of the present invention has shown an unusually slow decay rate, particularly at elevated temperatures. Accordingly, excellent stabilization may be obtained for longer periods of time than when employing, in like amount, other materials of excellent inhibiting properties. In addition, the slower decay rate results in the formation of less color bodies than conventional polymerization inhibitors over almost any given period of time.

The inhibitor of the present invention may be incorporated in the monomer in different ways. The inhibitor, for instance, may first be prepared by bringing together a ferrous iron salt, such as ferrous sulfate, and the like, and the ammonium salt of N-nitrosophenylhydroxylamine. The resulting solid metal complex is then dissolved in the liquid monomer contemplated herein, or a solution thereof, or the complex may be mixed with a solid monomer.

A particularly successful method of incorporating the inhibitor into the liquid monomer or solution thereof is to provide in the monomer stoichiometric amounts of the ammonium salt of N-nitrosophenylhydroxylamine and a ferrous iron salt so that the complex forms in situ. This practice is advantageous in that the rate of solubility of the complex in the monomer or solution thereof is thus rendered unusually high.

The amount of inhibitor employed in accordance with this invention may be varied. The optimum amount employed in any particular situation may be readily determined by those skilled in the art. In general, however, as little as 5 parts per million of complex by weight of monomer will provide stabilization to a certain degree. Continued improvement may be observed by increasing this amount to as high as 2000 parts per million and even higher, although it has been observed that these latter concentrations are usually unnecessary. For most situations, it has been observed that a concentration of about 15–300 parts per million is adequate to obtain the desired stabilization.

By α-alkyl acrylamide, pursuant to the instant discovery, is meant acrylamide substituted on the α-carbon by an alkyl radical of not more than about 8 carbon atoms.

The invention is further illustrated by the following example. Unless otherwise noted all parts are by weight.

EXAMPLE I

In a 50 percent by weight acrylamide solution (aqueous) is provided 100 parts per million, based on the weight of the acrylamide, of the ferrous chelate of N-nitrosophenylhydroxylamine

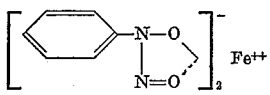

The inhibitor is prepared in situ by first introducing ferrous sulfate into the acrylamide solution and then a corresponding stoichiometric quantity of the ammonium salt of N-nitrosophenylhydroxylamine, the ferrous sulfate and N-nitrosophenylhydroxylamine being present in sufficient amount to provide 100 parts per million, based on the weight of the acrylamide, of the ferrous chelate.

Admixture of these materials is carried out at 50° C. and the resulting mixture maintained at this temperature and at a pressure of 50 millimeters mercury (absolute) for over 19 hours.

Likewise an identical standard solution (blank) of acrylamide containing no inhibitor is provided and maintained at the same temperature and pressure for over 19 hours.

At the end of 19 hours the viscosity in centipoises at 40° C. of the solution containing no inhibitor is over 30 times greater than the viscosity in centipoises at 40° C. of the solution containing the ferrous chelate of N-nitrosophenylhydroxylamine.

While the present invention has been described in detail as to specific embodiments thereof, it is not intended that these details create undue limitations upon the scope of the discovery, except insofar as they appear in the appended claims.

We claim:

1. A method of inhibiting the polymerization of a solution of an amide selected from the group consisting of acrylamide and α-alkyl acrylamides which comprises incorporating therein the ferrous iron complex of N-nitrosophenylhydroxylamine as a polymerization inhibitor.

2. A method according to claim 1 in which the amount of inhibitor is at least 5 parts per million parts of solution.

3. A method according to claim 2 in which the amide is acrylamide and the amount of inhibitor is about 15–300 parts per million parts of solution.

4. A solution of an amide selected from the group consisting of acrylamide and α-alkyl acrylamides stabilized against polymerization, said solution containing the ferrous iron complex of N-nitrosophenylhydroxylamine as a polymerization inhibitor.

5. A solution according to claim 4 in which the amount of inhibitor is at least 5 parts per million of solution.

6. A solution according to claim 4 in which the amide is acrylamide and the amount of inhibitor is about 15–300 parts per million parts of solution.

7. A method of inhibiting the polymerization of a monomer selected from the group consisting of acrylamide and α-alkyl acrylamides which comprises providing in an aqueous solution of said monomer stoichiometric equivalents of N-nitrosophenylhydroxylamine and a ferrous iron salt.

8. The method according to claim 7 wherein the ferrous iron salt is first introduced into the aqueous solution of said monomer and the stoichiometric equivalent of the ammonium salt of N-nitrosophenylhydroxylamine is added thereto.

References Cited in the file of this patent

UNITED STATES PATENTS

| | | |
|---|---|---|
| 2,720,545 | Mallinckrodt et al. | Oct. 11, 1955 |
| 2,758,131 | Couvillon | Aug. 7, 1956 |
| 2,787,634 | Coover et al. | Apr. 2, 1957 |
| 2,840,611 | Bikales et al. | June 24, 1958 |